United States Patent [19]

Keener et al.

[11] Patent Number: 5,283,511
[45] Date of Patent: Feb. 1, 1994

[54] RECHARGEABLE BATTERY MANAGER

[76] Inventors: Thomas Keener, 875 Waimanu St., Suite 632, Honolulu, Hi. 96813; W. Joe Watson, 3005 Broken Bow Rd., Edmond, Okla. 73013

[21] Appl. No.: 895,331

[22] Filed: Jun. 8, 1992

[51] Int. Cl.⁵ .............................................. H02J 7/00
[52] U.S. Cl. .......................................... 320/2; 320/14; 320/22
[58] Field of Search ................. 320/2, 5, 6, 14, 15, 320/22, 23, 24, 20, 21, 31, 32, 39, 40

[56] References Cited

U.S. PATENT DOCUMENTS

| | | | |
|---|---|---|---|
| 3,454,859 | 7/1969 | Ford et al. | 320/6 |
| 3,992,658 | 11/1976 | Bechtold et al. | 320/20 |
| 4,048,551 | 9/1977 | Bosik | 320/21 |
| 4,084,124 | 4/1978 | Kapustka | 320/15 X |
| 4,179,648 | 12/1979 | Samsioe | 320/23 X |
| 4,302,714 | 11/1981 | Yefsky | 320/5 |
| 4,342,954 | 8/1982 | Griffith | 320/14 |
| 4,413,221 | 11/1983 | Benjamin et al. | 320/14 X |
| 4,424,476 | 1/1984 | Mullersman | 320/36 |
| 4,628,243 | 12/1986 | Hodgman et al. | 320/2 |
| 4,695,784 | 9/1987 | Reynolds | 320/32 |
| 4,710,694 | 12/1987 | Sutphin et al. | 320/21 |
| 4,737,702 | 4/1988 | Koenck | 320/5 X |
| 4,742,289 | 5/1988 | Wahlstrom | 320/14 |
| 4,767,977 | 8/1988 | Fasen et al. | 320/20 |
| 4,806,840 | 2/1989 | Alexander et al. | 320/20 |
| 4,829,225 | 5/1989 | Podrazhansky et al. | 320/14 |
| 4,873,479 | 10/1989 | Iimura et al. | 320/2 |
| 4,963,812 | 10/1990 | Mischenko et al. | 320/2 |
| 4,965,507 | 10/1990 | Smilanich et al. | 320/22 X |
| 5,065,082 | 11/1991 | Fushiya | 320/2 |
| 5,111,128 | 5/1992 | Branan, Jr. et al. | 320/2 |
| 5,162,719 | 11/1992 | Tomura et al. | 320/2 |
| 5,164,652 | 11/1992 | Johnson et al. | 320/2 |

Primary Examiner—Kristine L. Peckman
Attorney, Agent, or Firm—James Creighton Wray

[57] ABSTRACT

Apparatus and method for conditioning batteries such as those of the nickel-cadmium type for which deep discharge prior to recharge is desirable. Mechanical programming plates having different patterns of apertures for batteries of different characteristics are provided. When a battery is to be conditioned, one of the programming plates having an aperture pattern representing the characteristics of that battery is attached to the battery and the combined battery/programming plate is positioned on the battery conditioner. A surface of the conditioner contains programming pins that sense the aperture pattern on the programming plate and automatically program the discharging/charging circuits to provide a discharge/charge sequence that is tailored to the particular characteristics of the battery being conditioned.

16 Claims, 8 Drawing Sheets

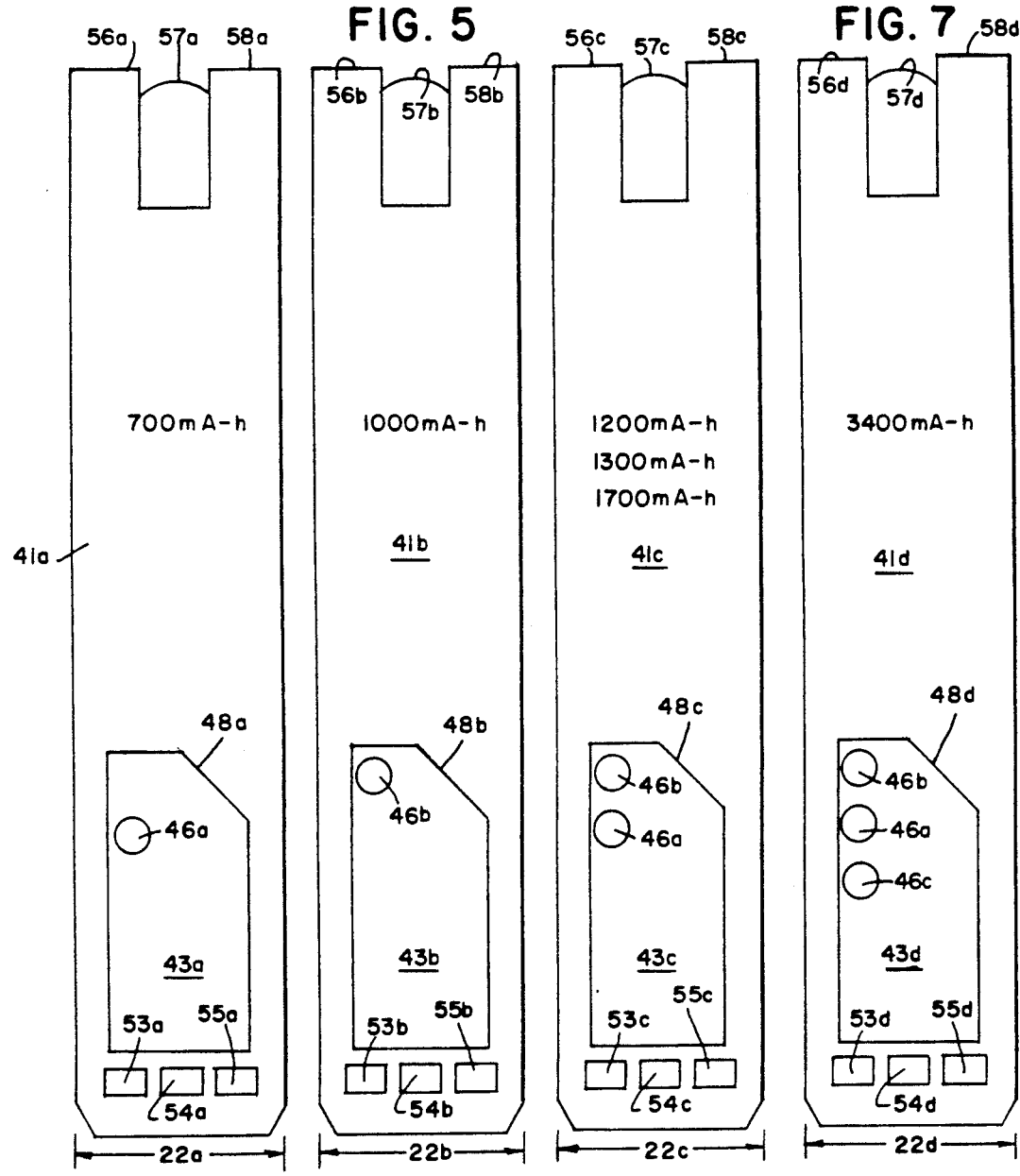

| BATTERY TYPE | LO | MED | LOV- | PIN_C |
|---|---|---|---|---|
| 6V/450mAh | GND | OPEN | GND | OPEN |
| 6V/750mAh | GND | OPEN | GND | OPEN |
| 6V/1070mAh | OPEN | GND | GND | OPEN |
| 7.2V/700mAh | GND | OPEN | OPEN | GND |
| 7.2V/1000mAh | OPEN | GND | OPEN | GND |
| 7.2V/1200mAh | OPEN | OPEN | OPEN | GND |
| 7.5V/1300mAh | OPEN | OPEN | OPEN | GND |
| 7.2V/1700mAh | OPEN | OPEN | OPEN | GND |
| 7.2V/3400mAh | OPEN | OPEN | OPEN | OPEN |

FIG. 13

RECHARGEABLE BATTERY MANAGER

This invention relates to battery charging and more particularly to a managed profile and facilitated programming of battery discharging and recharging so as to extend useful lifetimes and maintain service capacities of batteries which tend to develop undesirable "memory" characteristics.

BACKGROUND OF THE INVENTION

Various types of batteries require differing profiles of battery charging/discharging if they are to provide dependable service and optimum service life. For example, lead-acid batteries commonly employed in automobiles retain optimal service life and characteristics best when maintained essentially fully charged. Such batteries suffer degradation and service life characteristics when they are subjected to deep discharge. Conversely, other types of rechargeable batteries tend to maintain optimal characteristics only if during each charge/discharge cycle, they are deeply discharged. Examples of such batteries are those of the popular nickel cadmium variety.

Nickel cadmium batteries, if recharged after only partial discharge, tend to experience deterioration in their total charging capability. Thus, after several such cycles, a nickel cadmium battery will typically retain substantially less than its originally rated number of ampere hours, a result that is generally considered to be disadvantageous and to be avoided when practicable. However, it has been the practice in the past for battery users to oftentimes substitute a fresh battery for one which has had some use prior to full discharge so as to avoid experiencing complete loss of battery power during an extended period of use, thereby introducing the danger of adversely impacting subsequent battery characteristics of the only partially discharged battery.

To overcome the potentially deleterious results of repeatedly recharging batteries such as nickel cadmium batteries after only partial discharge, prior art proposals include the intentional deep discharge of any charge remaining in the battery as part of the recharging process. Illustrative of such a procedure are the proposals of U.S. Pat. Nos. 4,179,648, granted to Edward Samsioe on Dec. 18, 1979 and 4,302,714 to Sheldon Yefsky on Nov. 24, 1981.

Although these proposals were directed generally to the solution of the aforementioned problems, there still existed the matter of setting discharge and recharging conditions to tailor them to optimum levels for any of a variety of battery sizes and current ratings. One proposal includes the tailored conditioning of the equipment parameters to reflect the specific characteristics of a battery by providing for the manual setting of dip switches. However, such have been subject to the undesirable consequences of setting errors, switch malfunction, or loss of instructions for switch setting.

BRIEF SUMMARY OF THE INVENTION

The inventive proposals hereof overcome the above described disadvantages by providing a programmed intentional discharge for each battery according to the level of discharge required to achieve what is generally known as "deep discharge." Thus, each battery that is positioned in the recharger for recharging is first deeply discharged so that the above-described adverse memory characteristic does not significantly degrade battery characteristics. This is accomplished while avoiding reverse polarization. The battery is then fully recharged according to a programmed charging schedule which is specifically adapted to the type and capacity of the battery involved, thereby providing an optimal management of the charge/discharge cycle.

OBJECTS AND FEATURES OF THE INVENTION

It is one general object of this invention to improve performance of nickel cadmium batteries.

It is another object of the invention to facilitate discharge and recharging of such batteries.

It is still another object of the invention to facilitate tailoring of the discharge/charge parameters to the specific characteristics of such batteries.

Accordingly, in accordance with one feature of the invention, nickel cadmium batteries are subjected to intentional deep discharge by the improved apparatus hereof and then subjected to complete automatically programmed recharge thereby simplifying and optimizing the charging of the battery.

In accordance with another feature of the invention, improved mechanisms for battery identification by the charger are provided, thereby simplifying identification and facilitating selective conditioning according to the particular characteristics of the battery involved.

In accordance with still another feature of the invention, the aforementioned battery identification mechanisms are adapted to automatically program simple battery conditioning control circuits, thereby facilitating conditioning programs tailored to the particular characteristics of any of a selected variety of batteries.

BRIEF DESCRIPTION OF THE DRAWING

FIG. 4 is a plan view of a programming plate mounted on a narrow 700 milliampere hour battery;

FIG. 5 is a plan view of a programming plate mounted on a narrow 1000 milliampere hour battery;

FIG. 6 is a plan view of a programming plate mounted on any one of 1200, 1300 or 1700 milliampere hour batteries;

FIG. 7 is a plan view of a programming plate mounted on a 3400 milliampere hour battery;

FIG. 13 is a schematic diagram depicting the charge/discharge control circuits.

DETAILED DESCRIPTION OF THE INVENTION

Figure 1:
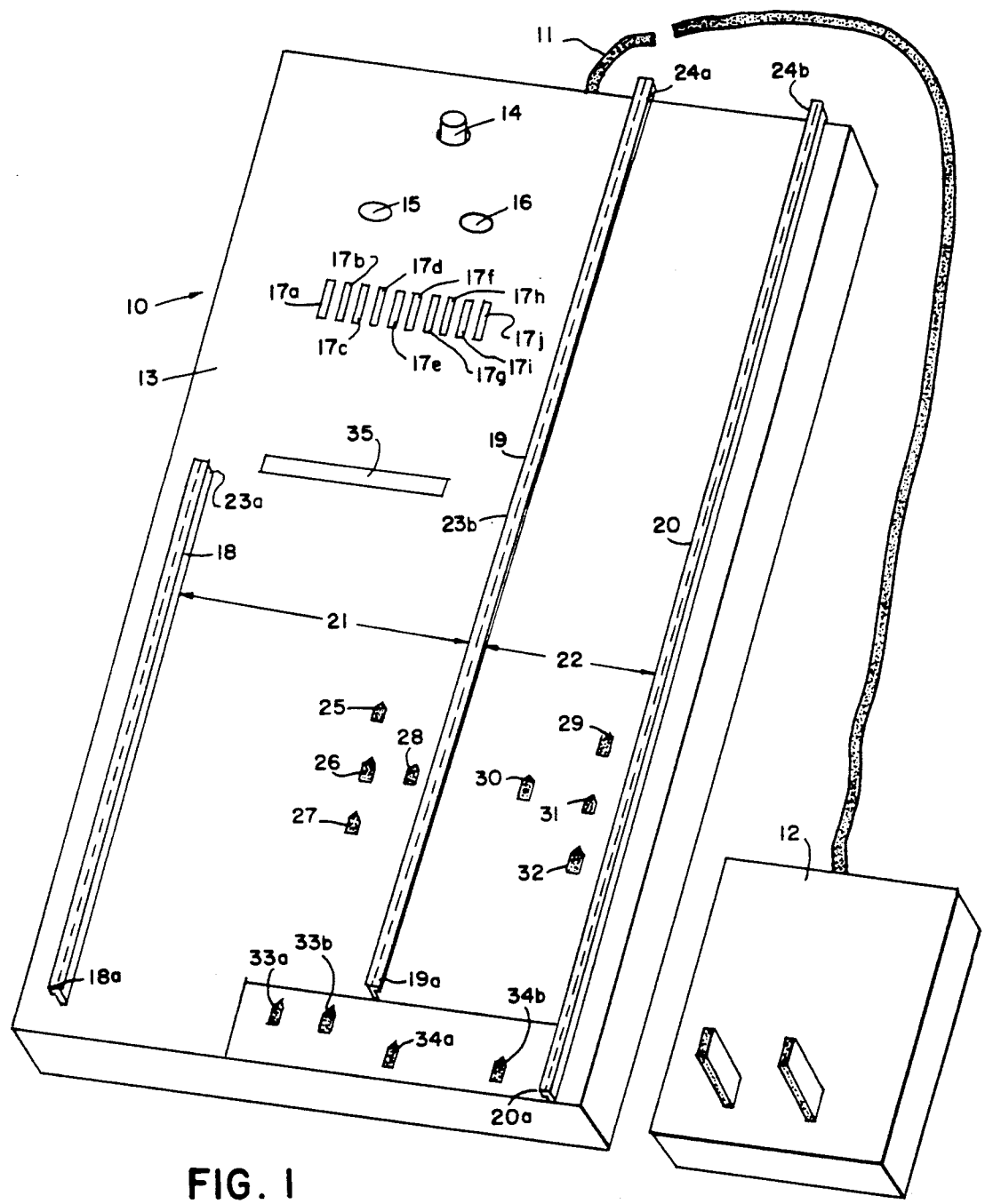
FIG. 1 is a perspective view depicting the improved rechargeable Battery Manager.

Now turning to the drawing and more particularly FIG. 1 thereof, it will be observed that there is therein depicted in perspective a Battery Manager shown at 10 generally constructed in accordance with the principles of the invention. Shown at the upper end thereof is a conventional power cord 11 which connects the Battery Manager 10 to a conventional step down transformer 12 which, according to the preferred embodiment hereof, produces about 16.5 volts a-c and which has a current capacity of 600 milliamperes or more.

Also shown on the upper face 13 are recycle push button 14, charge light 15 and discharge light 16.

Below the charge and discharge lights 15 and 16 there are included a plurality of battery voltage level indicators which preferably are ten light emitting diodes 17a–17j. These diodes, as will be observed from the detailed description below, provide a visual indication of the level of charge which exists on the battery at any given time. Next, and below the battery level indicators, there preferably is a nameplate which applicant has designated in FIG. 1 with his trademark Cell-U-Life.

Further reference to FIG. 1 reveals that on the upper face 13 of the Battery Manager 10 there are disposed a plurality of rails 18, 19 and 20. These rails are positioned to engage mating geometries of the batteries such as those available from the Motorola Company for use with their cellular telephones. Thus, the distance between rails 18 and 19 shown as dimension 21 is essentially equal to the corresponding dimension of a wide family of such batteries. On the other hand, the physical distance 22 between rails 19 and 20 corresponds to the corresponding width dimensions between mating geometries of a narrower family of such batteries.

Guide rails 18, 19 and 20 include longitudinal lips 18a, 19a and 20a for receiving and mating with the corresponding surfaces of mating battery geometries, and any of a variety of conventional stops such as battery stop projection 35 may preferably be included near positions 23a–23b for use in seating the wider batteries and at locations 24a and 24b for the narrower batteries.

Projecting upwardly through the upper surface 13 of the Battery Manager 10 are a plurality of depressible spring loaded conically topped programming pins 25–32. These pins are connected into the electrical circuits so as to distinguish between the characteristics of the different batteries that may be utilized with the Battery Manager and operate in accordance with the description of the circuits set forth below.

Also projecting upwardly through the upper face 13 of battery manager 10 are two pairs of conically topped spring loaded electrical contacts 33a–33b and 34a–34b. These pairs of electrical contacts are provided to make electrical contact directly with the positive/negative terminals of the batteries so as to provide for discharging and charging therethrough. Accordingly, when one of the batteries is deployed in position so that its programming plate is deployed into the correct position, appropriate electrical contacts are also made through contacts 33a–33b or 34a–34b with the battery terminals.

Figure 2:
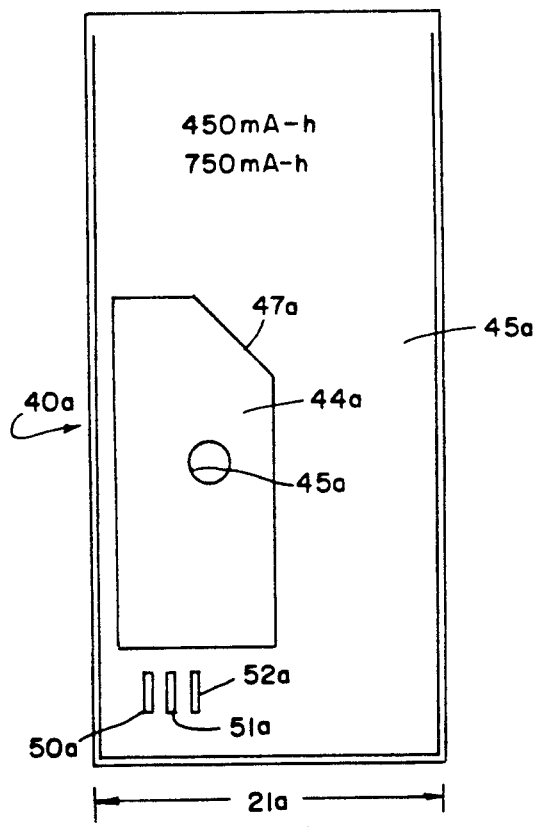
FIG. 2 is a plan view of a programming plate mounted on a 450-750 milliampere hour battery.
Figure 3:
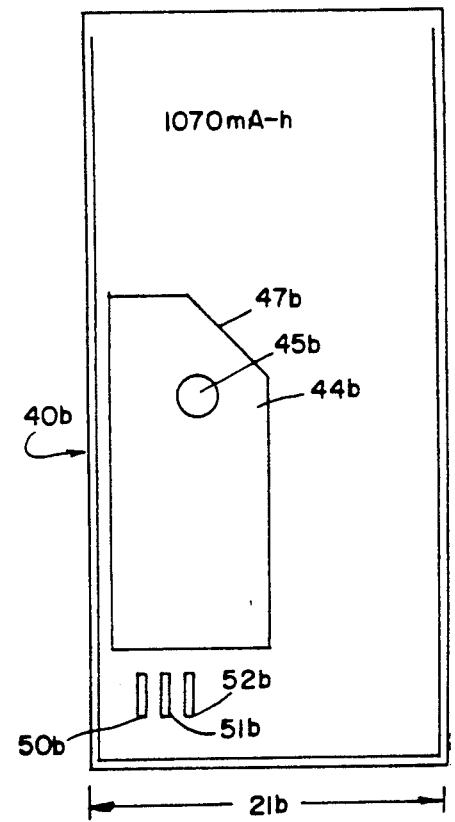
FIG. 3 is a plan view of a programming plate mounted on a 1070 milliampere hour battery.
Figures 8, 9:
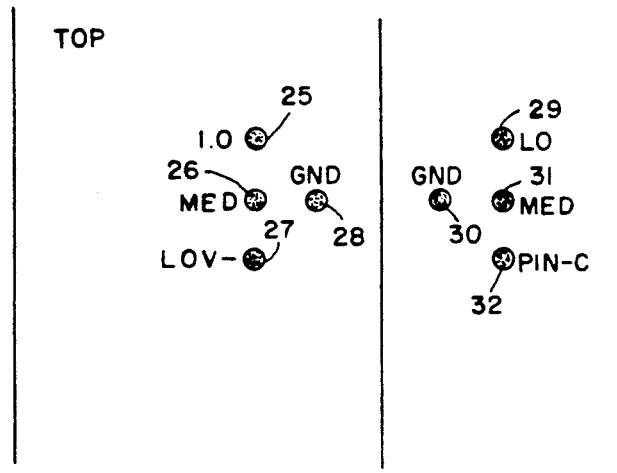
FIG. 8 is a detailed view depicting the layout of the programming pins which are shown in FIG. 1.
FIG. 9 is a matrix identifying a representative group of nine batteries which the equipment hereof is adapted to charge.

Reference is now made to FIGS. 2 and 3 which are seen to depict relatively wide batteries 40a and 40b which are of the 6 volt rating as illustrated by the first three entries in the matrix of FIG. 9. Programming plates 44a and 44b as well as programming plates 43a–43d (FIGS. 4–7) include on their reverse sides (not shown) layers of adhesive material or other known attachments for providing attachment of a battery thereto. In use, an appropriate programming plate is attached to a battery by such adhesive, the particular programming plate being selected according to the milliampere hour and voltage capacities that are represented by the plates of FIGS. 2–7.

Referring again in more detail to the programming plate of FIG. 2 which illustrates the principles embodied in all of the programming plates, it will be observed that it extends upwardly slightly (by the thickness of the plate) above the principal surface 45a of the battery 40a so as to provide in region 44a a dimension of greater thickness. Projecting entirely through the region of greater thickness is a circular aperture 45a which is adapted to overlie and be in registration with programming pin 26 when battery 40a is inserted into its position immediately above and adjacent the upper surface 13 of the Battery Manager 10. Since under such condition, depressible spring loaded pin 26 will be in registration with aperture 45a, it will be thrust upwardly by the spring action so as to move upwardly into aperture 45a. A similar condition will result when battery 40b is inserted between rails 18 and 19 and thrust into position until it engages the stop 35 adjacent regions 23a and 23b except that for battery 40b, aperture 45b will be in registration with programming pin 25, thus permitting pin 25 to be thrust upwardly into and within aperture 45b.

Consideration of the programming plates and the battery manager upper surfaces shown in FIG. 1 reveals that programming pins other than those which are in registration with apertures 45a–b and 46a–46c (FIGS. 4–7) will be depressed so that they do not project upwardly significantly above the surface 13 of the Battery Manager 10 but instead are urged by their springs into contact with the overlying surface of the programming plate which then effectively extends electrical ground to those pins which do not extend into the apertures.

Since programming pins 25–32 are spring loaded so that in the absence of a programming plate all of them extend upwardly significantly above upper surface 13, it is necessary to insure that they become properly depressed when the programming plate is installed on the surface of the battery manager. This may be accomplished by beveling, roofing or conically shaping the tops of the pins in configurations contemplating the utilization of grooves in guide rails 18–20. However, as an alternative, and in other configurations, the weight of the battery itself can be sufficient to overcome the spring loading of the programming pins and thereby effect corresponding connections.

Further reference to FIGS. 2–7 reveals the presence of regions 50a–50b, 51a–51b and 52a–52b on the relatively wide batteries 40a–40b, as well as regions 53a–53d, 54a–54d and 55a–55d. These regions are provided for making terminal and ground connections to the batteries.

Referring now more particularly to FIGS. 4–7, it will be observed that at the upper ends thereof there are provided regions 56a–56d, 57a–57d and 58a–58d. These are merely geometrical shapes of the battery housings and are not of consequence to the inventions hereof.

Now turning to FIG. 8, it will be observed that there are therein depicted the programming pins of FIG. 1 shown together with abbreviations identifying the logic to which they appertain. Thus, programming pin 25 is seen to be identified as "LO"; pin 26 is identified as "MED"; pin 27 is identified as "LOV−"; and pin 28 is identified as "GND." Similarly, the programming pins associated with the narrower programming plates are functionally identified, programming pin 29 being "LO"; pin 31 being "MED"; pin 32 being identified as "PIN-C"; and pin 30 being identified "GND".

FIG. 9 is a matrix identifying nine representative battery types for which discharge/charge programming is provided in this preferred embodiment. However, it will be evident to those skilled in the art that many other types of batteries could be employed with corresponding changes that will be self-evident from the following description of the schematic diagrams.

Further reference to FIG. 8 reveals that for both the wide and narrow batteries there is provided a programming pin identified "GND." These two pins which are designated with numerals 28 and 30, always make contact with the programming plate when the plate is in position, thereby completing an electrical path to ground the programming plate that is in use. For each of the remaining pins 25–27, 29 and 31–32, ground potential is established thereon through physical contact with the programming plate except for such one or ones of the programming pins as extend through the aforementioned apertures and which therefore do not contact the programming plate so as to be conditioned to ground potential. These conditions are represented in the matrix of FIG. 9 by use of the corresponding terms "GND" and "OPEN."

As mentioned above, FIG. 10 depicts the schematic electrical diagrams for the charger and conditioner (discharge/charge) portions of the battery manager circuits. There, in the upper left hand corner are seen symbols 100 and 101 which are indicated as ACIN, thus representing connections to the conventional secondary winding of transformer 12 (FIG. 1). The 16.5 volt alternating current is communicated via conductors 102 and 103 to a conventional bridge rectifier 104 which converts the ac input to a full-wave rectified (pulsed d-c) form. As is well known in the art, this waveform consists of a continuing stream of direct current pulses having half-sine wave forms at a frequency twice that of the power line frequency appearing at the ACIN terminals 100 and 101. This pulsed dc voltage is used to produce the charging current for the charging portion of the conditioning cycle and is labeled as V+ shown at terminal 106.

Varistor 107 which preferably is a metal-oxide varistor, provides a shunt current path if the ac voltage on the ACIN terminals is excessive. This protects the unit from voltage spikes or surges which may occur on the ac power lines and be coupled through the wall transformer.

In addition to the rectifier output appearing at V+ terminal 106, the aforementioned stream of dc pulses is conducted through dropping resistor 108 to a 5 volt zener diode 109 and a filtering (smoothing) capacitor 110 which substantially eliminates the ac ripple otherwise appearing on the direct current output to 5 volt terminal 111. Thus, although the voltage appearing at terminal 106 is, as mentioned above, of highly pulsating wave form, the voltage appearing at terminal 111 is essentially maintained at a constant level of about 5 volts dc. It is this filtered and essentially constant 5 volt dc voltage which is utilized to power the logic and control circuits of the Battery Manager.

Figure 10:
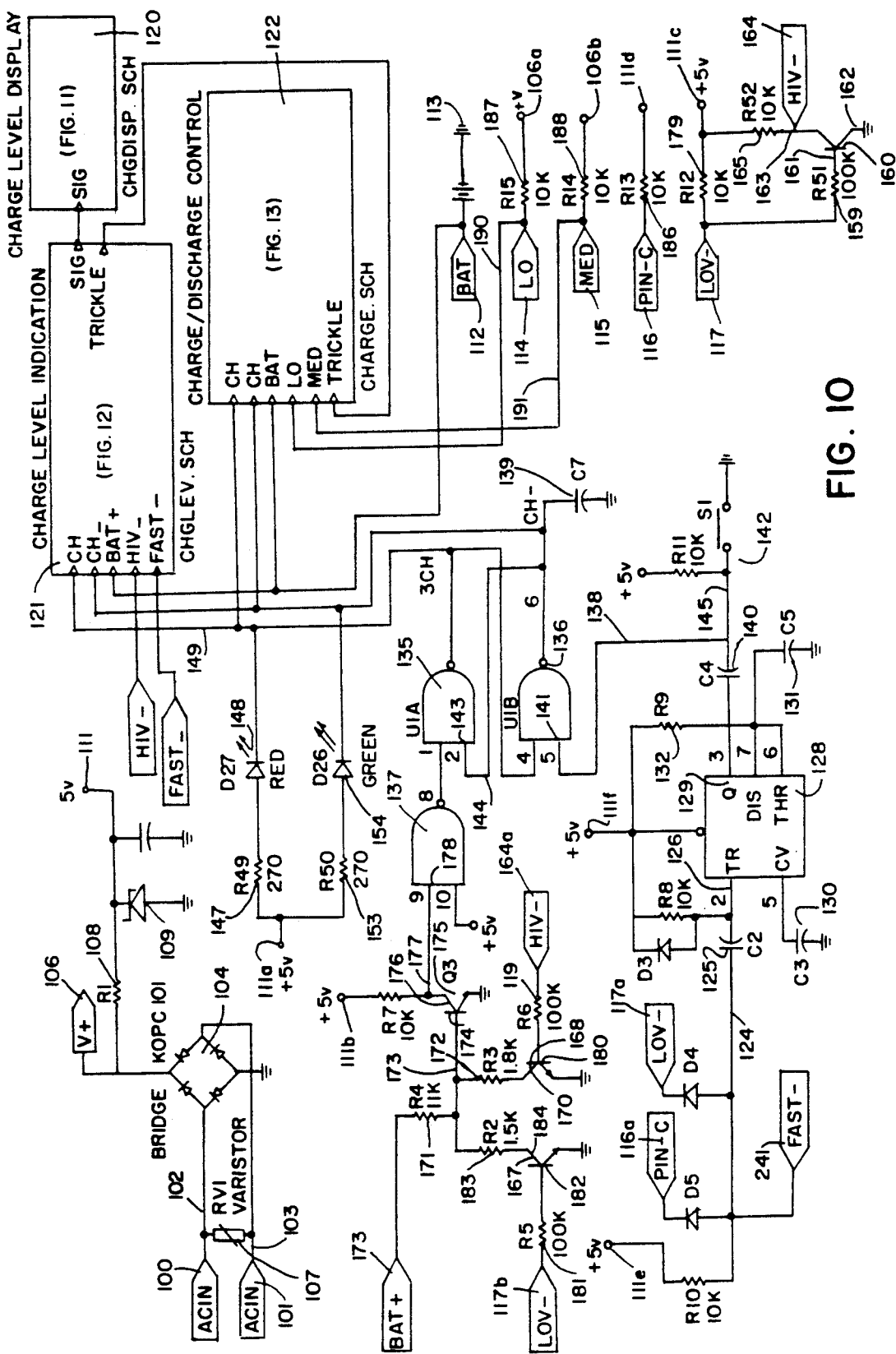
FIG. 10 is a schematic diagram depicting the charger/conditioner circuits.

When a battery is attached to the programming plate and the programming plate is in position, connections are made from the plus and minus terminals of the battery to the discharge/charging circuits as is represented by symbols 112 and 113 appearing in the right hand central portion of FIG. 10. Appearing successively below battery terminal 112 are the programming pin connections 114 (LO), pin 115 (MED), 116 (PIN-C), and 117 (LOV−).

Figure 11:
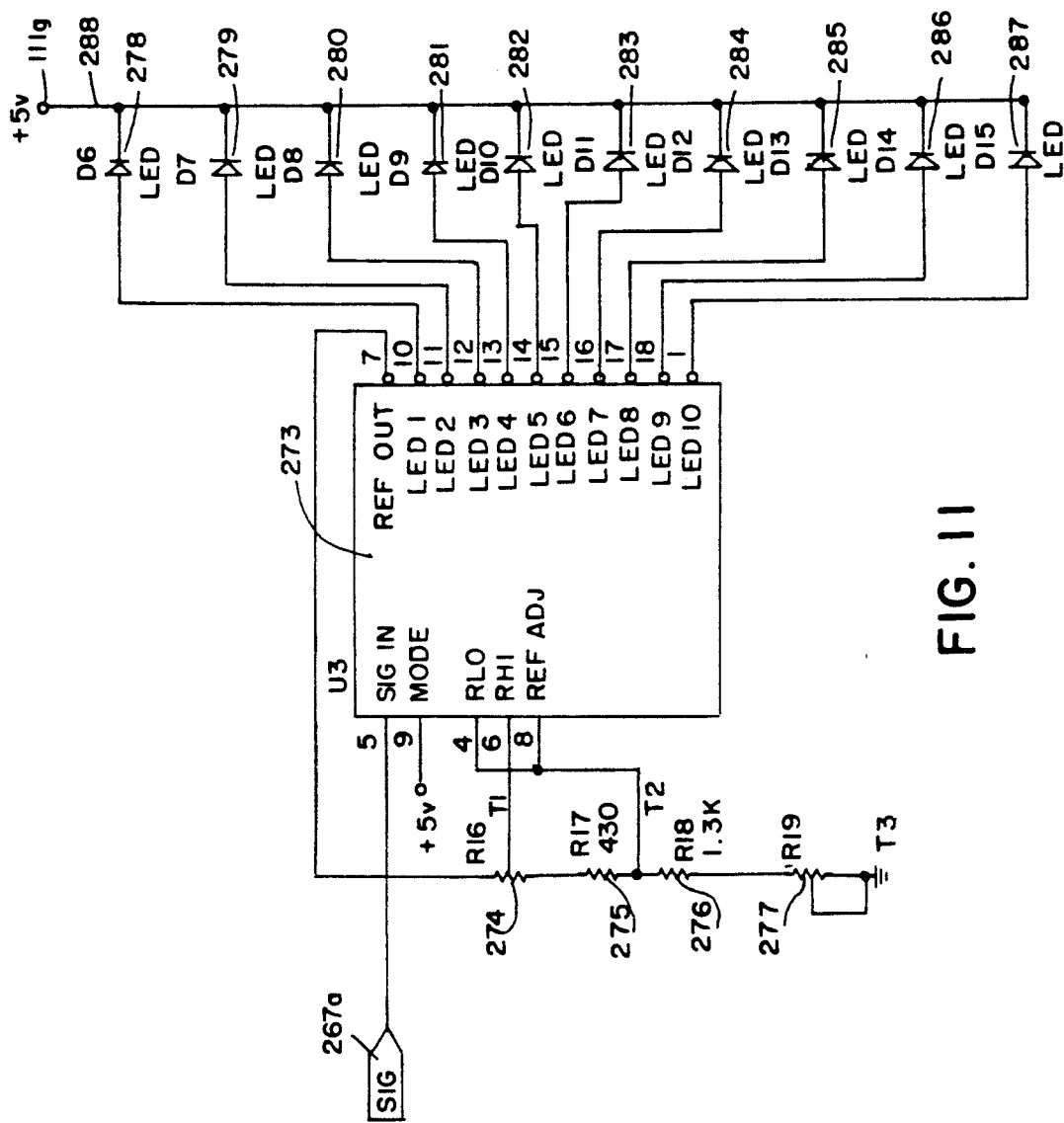
FIG. 11 is a schematic diagram depicting the charge level display circuits.
Figure 12:
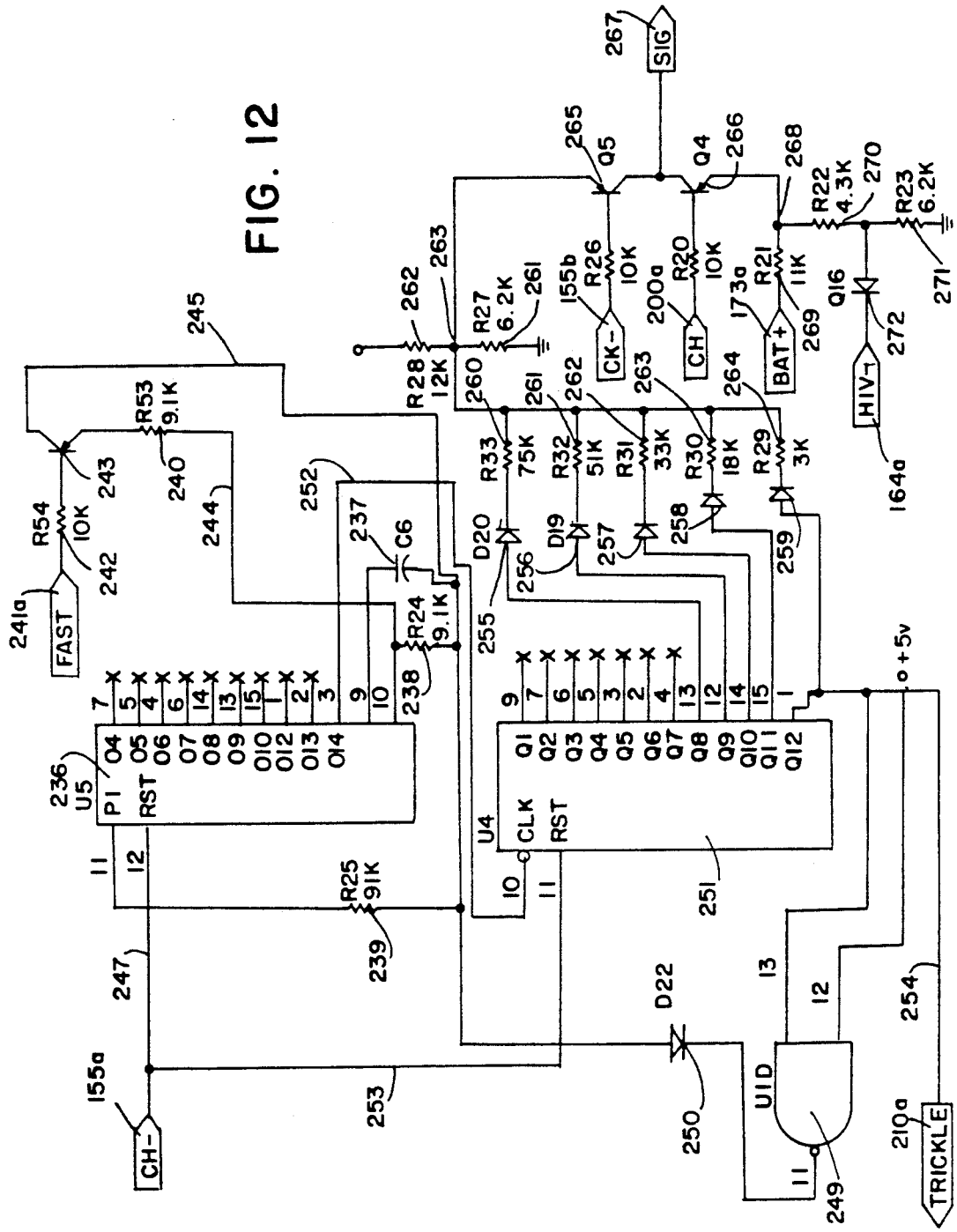
FIG. 12 is a schematic diagram depicting charge level indication circuits.
Figure 13:
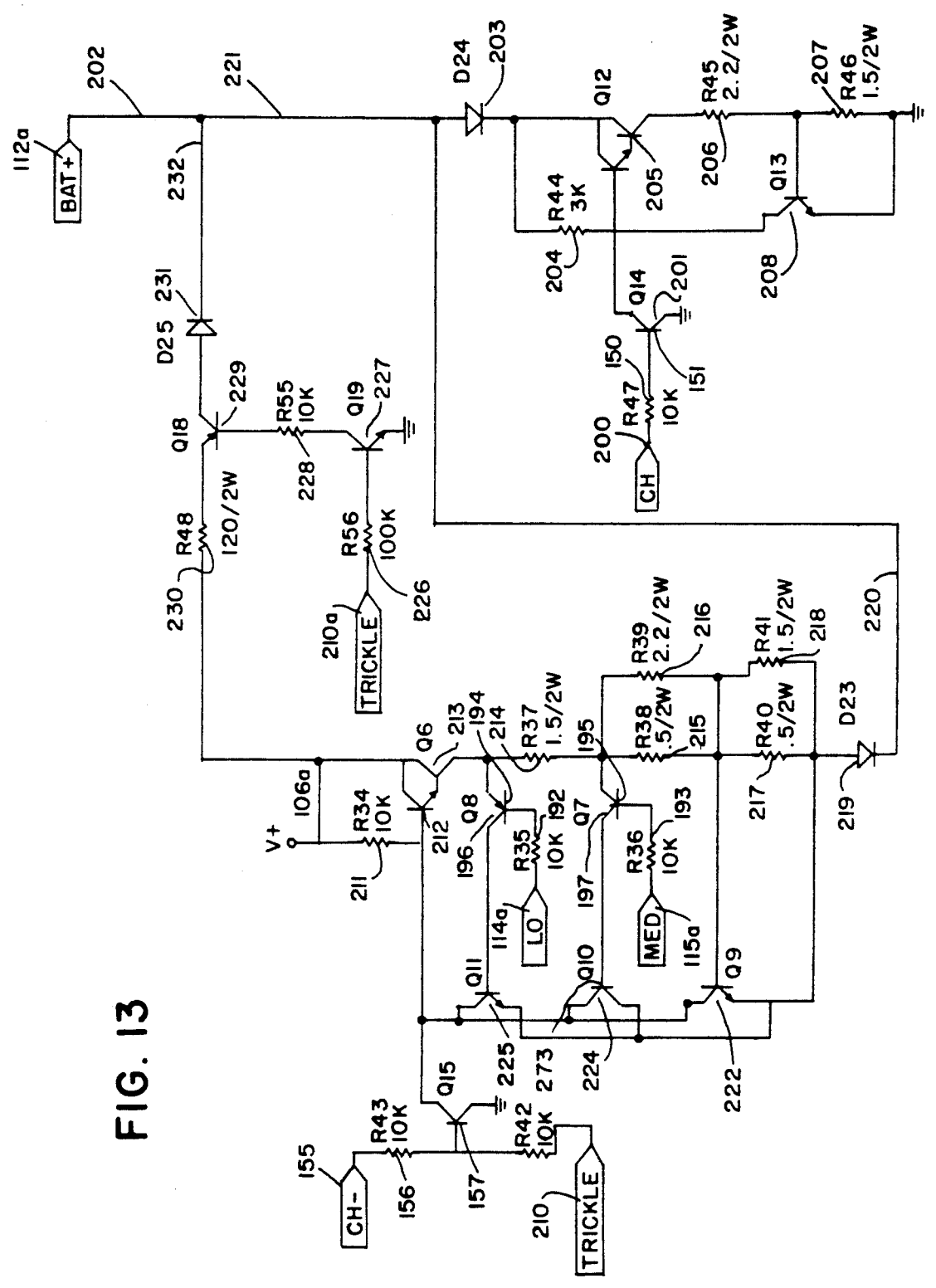

In the upper right hand portion of FIG. 10, there are three rectangular boxes 120, 121 and 122 which respectively indicate the charge level display circuits of FIG. 11, the charge level indication circuits of FIG. 12 and the charge/discharge control circuits of FIG. 13. The terminal designators appearing at the sides of rectangles 120–122 are designated with symbols corresponding to those which appear in FIGS. 11–13.

As mentioned above, the batteries 40a/40b are shown in widths measured by dimension 21a and 21b, whereas batteries 41a–41d are shown as having widths 22a–22d, the latter being substantially narrower than the former. The reason for this is that of the types of batteries selected for illustration in this preferred embodiment, the batteries are generally in two separate and distinct widths corresponding to the widths 21a–21b and 22a–22d. For each of these two representative widths, there are provided on the face 13 of the Battery Manager (FIG. 1) the two battery terminal contact pins previously mentioned and represented by terminals 112 and 113. In addition, and again as mentioned above, four programming pins are provided for each category (i.e., wide or long and narrow) of battery. In each instance, one of the programming contact pins, namely the pin 28 or 30 is connected to ground. The remaining three programming pins have, for ease of understanding of the circuits, been identified with symbols that severally represent a function performed by the pin. Thus, for the relatively wide batteries, three programming pins are designated as LO (standing for low), MED (standing for medium), and LOV− (standing for low voltage). Correspondingly, for long and slender batteries which use the narrower programming plates, corresponding designators are LO (again standing for low), MED (again standing for medium), and PIN-C (standing for normal time count).

The aforementioned programming pin represented by symbols 28/30 always makes contact with the programming plate whenever a battery and its associated programming plate are in the discharge/charge position on the face of the battery manager. The remaining programming pins, other than those in registration with one of the aforementioned circular holes, are grounded by contact with the overlying surface of the programming plate. However, as mentioned above, when one of the apertures is in registration with a programming pin, such pin moves upwardly through the aperture thereby avoiding contact with the plate and residing in an ungrounded or open condition. As will be evident from the following description, such an ungrounded or open pin will reside at a relatively high electrical potential. Of course, when it is grounded, its corresponding logic signal is low.

As previously mentioned, when a battery is to be conditioned, i.e., discharged/charged by the Battery Manager, it is first attached to the related one of the aforementioned programming plates. Thereafter, such program plate with the battery attached is positioned over the face 13 of battery manager 10. In so doing, the programming plate makes contact with the aforementioned grounding pin, and either PIN-C (116a) or pin LOV− (117a) is at least momentarily grounded as the programming plate moves over one of them on its way into its fully seated position. When either of such pins 116a/117a is momentarily grounded, the voltage level on conductor 124 is taken essentially to ground potential, thereby resulting in the transmission of a negative pulse through capacitor 125 and thence via conductor 126 to the TR (trigger) terminal 127 of the timer circuit 128. Timer circuit 128 can be any of a variety of well known commercially available circuits such as the LM555 circuit sold by National Semiconductor Company.

The output 129 shown at Q is normally low. However, when the trigger pulse is applied to the TR terminal 127, the output 129 at terminal Q abruptly switches to a high state and remains at such state for approximately 2.2 seconds before reverting to its normally low state. This preferred time duration of approximately 2.2 seconds is determined by the values of capacitor 130, capacitor 131 and resistor 132. Accordingly, such time can be varied by correspondingly varying the parameters of these three circuit components. The purpose of the 2.2 second delay is to permit sufficient time for the battery programming plate with its attached battery to be inserted into its correct position before the remainder of the circuits are activated as will be observed from the description below.

Conventional NAND gates U1A and U1B (symbols 135 and 136) are cross connected to form a conventional bistable NAND latch, the two stable states of which are: (a) the output of gate 136 being low which in turn causes the output of gate 135 to be high. Such conditions prevail so long as the external input to NAND gate 135 from NAND gate U1C (symbol 137) is high and the external input to NAND gate 136 via conductor 138 is high. The first of these conditions (i.e., condition a) is forced as an initial condition when power is first applied by virtue of the presence of capacitor 139 which requires some finite time to charge and therefore momentarily holds the lower input pin 143 of NAND gate 135 low, thus producing a high output for NAND gate 135.

The two stable states of the aforementioned latching circuits comprising NAND gates 135 and 136 may be more readily understood if considered in their two respective conditions, one being identified as condition a and the other as condition b. Under condition a as described above, the output of NAND gate 135 is high and the output of NAND gate 136 is low. Conversely, under condition b, the output of NAND gate 135 is low and that of gate 136 is high. These correspond respectively to the charging mode (condition a) and the discharging mode (condition b).

As mentioned above, condition a (the charging condition) is forced momentarily when the unit is first powered up. At the end of the approximately 2.2 second time delay period, the output of timer circuit 128 appearing on terminal 129 reverts to a low state thereby conducting a negative pulse through capacitor 140 and conductor 138 to the terminal 141 of NAND gate 136 thereby causing the output of NAND gate 136 to change to its low state, a potential corresponding to such low state then being communicated over path 144 to input terminal 143 of NAND gate 135, thereby causing the output of NAND gate 135 to change to its low condition and the output of NAND gate 136 changing to its high condition (condition b). Accordingly, after the initial power up and approximate 2.2 second time delay, the circuits are conditioned to the discharge mode.

Considered reference to the circuits will reveal that the latching circuits represented by NAND gates 135 and 136 can be conditioned to condition b by only two events, both of which effect such conditioning by bringing the voltage appearing at terminal 141 of NAND gate 136 to a low value. The first of these has been described in connection with the effect of the timer circuits 128. The other is by virtue of any operation of push button switch 142 which corresponds to push button switch 14 of FIG. 1. Thus, if switch 142 is closed, a ground potential is conducted therethrough and via conductors 145 and 138 to terminal 141 of NAND gate 136, thus causing the output of NAND gate 136 to assume a high state which is communicated via conductor 144 to lower terminal 143 of NAND gate 135, thereby causing NAND gate 135 to change to a low condition.

The switching between conditions a and b depends, of course, upon the output from NAND gate 137 remaining high. Such, however, may not prevail as will be observed from the description of additional portions of the circuits set forth below.

When the above described latching circuits (gates 135 and 136) are in condition b (the discharging mode), current flows from the 5 volt supply (terminal 111a) and thence through resistor 147 and diode 148, and thence via conductor 149 and terminal "CH" in rectangular block 122, thence to the corresponding designation (terminal 200) in the lower right hand corner of FIG. 13 and via resistor 150 and transistor 151 to ground. Therefore diode 148 (corresponding to discharge light 16 in FIG. 1) is lit so as to indicate that discharge is occurring. Similarly, when the output of NAND gate 136 is low (that is, when the circuits are in charging condition a), current flow from 5 volt supply terminal 111a through resistor 153 and light emitting diode 154 and thence through terminal CH− of rectangle 122 (FIG. 13), through the CH− terminal 155, resistor 156 and transistor 157 to ground, thus illuminating light emitting diode 154 (which corresponds to charge indicator 15 of FIG. 1).

In addition to the foregoing, the only event other than the initialization accomplished as a consequence of the charging of capacitor 139 when the circuits are first turned on, which will cause entry into the charging mode, is the completion of a discharge cycle as determined by the full discharge sensor that will be hereinafter described.

Continuing with a description of the circuits, when a 6 volt battery (e.g., one of the first three items listed in the matrix of FIG. 9) is attached to its programming plate and the battery with the attached programming plate is positioned in place on the face of the Battery Manager, the above-described programming pattern causes contact pin 117 (LOV− in the lower right hand corner of FIG. 10) to be grounded because there is no aperture within the programming plate that is in registration with programming pin 117. Accordingly, grounding of pin 117 applies ground to the base 160 of transistor 161 thereby resulting in no potential difference between base 160 and emitter 162. Accordingly, transistor 161 is in its off or non-conducting state and the voltage at its collector 163 and correspondingly at the HIV− terminal is caused to be relatively high by virtue of the path extending from the plus 5 volts terminal 111c via resistor 165 to terminal HIV− terminal 164. Since the voltage appearing at LOV− terminal 117b (on the left hand side of FIG. 10) is low and the voltage on HIV− terminal 164a is high, transistor 167 is off and transistor 168 is on by virtue of the forward biasing of its base emitter junction through resistor 169.

When transistor 168 is on, its collector 170 is low. Therefore, resistors 171 and 172 form a voltage divider which ratios the actual battery voltage appearing at the battery plus terminal 173 such that a turn on voltage is conducted from the junction of resistors 171 and 172 via conductor 173 to the base 174 of transistor 175. Thus, transistor 175 is turned on only if voltage appearing on battery terminal 173 remains above approximately 4 volts (for 6 volt rated batteries), 4 volts being the low voltage limit used by the circuits for discharging 6 volt batteries. Accordingly, when the battery voltage attempts to drop below that value, transistor 175 is turned off, causing its collector 176 to go high. That relatively high voltage is conducted from the collector 176 via conductor 177 to input 178 of NAND gate 137. As will be observed from the diagrams, NAND gate 137 is connected as an inverter. Accordingly, when the collector 176 of transistor 175 goes high, the output of inverter NAND gate 137 goes low, thereby switching the mode of the above identified latching circuits of gates 135 and 136 to the charging state as will be described in greater detail below.

If, instead of a 6 volt battery, a 7.2 or a 7.5 volt battery is attached to the appropriate programming plate and positioned on the Battery Manager upper face 13, it will not overlie programming LOV— (item 27 in FIG. 8) and consequently such pin 27 will not be grounded. Accordingly, resistor 179 and resistor 159 provide a base current path from 5 volt terminal 111c to the base 160 of transistor 161 thereby causing it to be on and its output at terminal 164 to be low. This also results in the low voltage being communicated via terminal 164a and resistor 169 to the base 180 of transistor 168 thereby causing transistor 168 to be off. In addition, positive potential is communicated from terminal 111C via resistor 179, LOV— terminals 117 and 117b and resistor 181 to the base 182 of transistor 167 thereby causing transistor 167 to be on and resistor 183 to be essentially grounded by the potential thus appearing at collector 184 of transistor 167. Accordingly, resistors 171 and 183 form a voltage divider which functions in a similar fashion to the aforementioned voltage dividing circuit comprising resistors 171 and 172 except that the threshold voltage for turning off transistor 175 is set to be 5 volts instead of 4 volts, thereby reflecting the difference in nominal battery terminal potential between 7 and a fraction and 6 volts. As a consequence, when the 4 volt threshold is reached for a 6 volt battery or when the 5 volt threshold is reached for a 7.2-7.5 volt battery, the latching circuits comprising gates 135 and 136 are switched to the charge (condition a) mode.

Referring again to the right hand side of FIG. 10, programming pin 116 (PIN-C) will be seen to be connected through resistor 186 to 5 volt terminal 111d. Accordingly, programming pin 116 will be in a high (5 volt) state except when it is grounded by the aforementioned grounding plate for selected battery types. Similarly, programming pins 114 (LO) and 115 (MED) are connected respectively through resistors 187 and 188 to V+ terminals 106a and 106b; and paths are extended therefrom via conductors 190, 191 and the LO and MED terminals shown for the charge/discharge control rectangle 122 (FIG. 13) and thence in FIG. 13 via LO and MED terminals 114a and 115a and series base resistors 192 and 193 to the bases 194 and 195 of transistors 196 and 197 whence they are effective to control current therethrough and correspondingly control battery charging.

As described above, when power is first applied to the circuits, they briefly are conditioned to the charging mode (condition a). Then, when a battery to be conditioned and its attached programming plate are positioned on the face of the battery manager, the mode switches to the discharge mode. When in the discharge mode (condition b), the voltage appearing at the output of NAND gate 135 is low and consequently such low condition is communicated via conductor 149 to the CH terminal on charge level indication rectangle 121 and thence to corresponding terminal CH 200 (FIG. 13), and thence through resistor 150 to base 151 of transistor 201 thus turning transistor 201 off due to absence of base current therein. When transistor 201 is off, the battery to be discharged which is connected at BAT+ terminal 112 (FIG. 10) and terminal 112a on FIG. 13, discharges current via conductors 202 and 221, diode 203 and resistor 204 thereby turning on the Darlington pass control transistor 205. Accordingly, the emitter current of transistor 205 passes through resistors 206 and 207 to ground, thus gradually discharging the battery. In operation, as discharge current through resistor 207 increases, the higher voltage drop thereacross causes transistor 208 to conduct more heavily, thus taking more current away from the base of transistor 205. Accordingly, the net effect of transistors 205 and 208 together with resistors 204, 206 and 207 is to establish a control loop which holds the discharge current at an essentially constant value. This constant current discharge path through diode 203, transistor 205, resistor 206 and resistor 207 to ground remains essentially the same level for all of the various battery types.

When in the charge mode (condition a), the voltage appearing on CH terminal 200 is high, thereby turning on transistor 201 which robs transistor 205 of its base current and therefore breaks the discharge current path to ground.

Two levels of charging are provided by the circuits. These are a normal charging level and a trickle charging level. The regular charging level is selected according to the battery capacity as communicated to the circuits by the hole or aperture pattern in the associated programming plate. Such regular charging makes use of the full-wave rectifier pulses (described above) from the bridge rectifier 104. Under the general category of regular charging, there are three sub-categories which correspond respectively to low, medium and high regular charging levels. Each such subcategory provides a distinct level of charging which is maintained essentially constant (constant current) so long as that particular subcategory is in effect. Moreover, each is maintained for a measured period of time that is tailored to the particular characteristics of the particular battery type involved. Accordingly, the charging pulses which correspond to the above-described voltage pulses provided by bridge rectifier 104 remain essentially constant throughout the regular charging cycle.

Selection between the aforementioned regular charging levels is determined by the LO and MED programming pins 114 and 115 (pins 25/29 and 26/31 of FIG. 8) according to the table set forth in FIG. 9. Reference to FIG. 9 discloses that no more than one of the two LO and MED programming pins is grounded for any particular battery type. If the LO pin is grounded, the LO charging level results. If the MED pin is grounded, the medium charging level results; and if neither the LO nor MED pin is grounded, a high charging level results.

Referring again to FIG. 13, when regular charging is occurring, the potentials at the CH− terminal 155 and the trickle terminal 210 are both LO thus resulting in transistor 157 being turned off. Accordingly, voltage from V+ terminal 106a is conducted via resistor 211 to supply current to the base 212 of the Darlington pass transistor 213. Accordingly, the regular charging path is from V+ terminal 106a through transistor 213, resistor 214, the parallel combination of resistors 215/216, the parallel combination of resistors 217/218, diode 219, conductor 220 and conductors 221 and 202 to the battery plus terminal 112a.

If neither the LO pin 114a nor MED pin 115a is grounded, then transistors 196 and 197 are both in their off states. Consequently, transistor 222 will have its base emitter junction forward biased by the voltage drop across the parallel combination of resistors 217 and 218. However, as charging current tends to increase, the increased voltage drop across the parallel combination of resistors 217 and 218 tends to turn transistor 222 on more heavily thereby causing some of the base current being supplied to transistor 213 through resistor 211 to be diverted through transistor 222 and thence to ground through diode 219, conductor 220, diode 203 and transistors 205/208 to ground. Conversely, when the charging current tends to decrease, the decreased voltage drop across the combination of resistors 217 and 218 tends to decrease the amount of current that transistor 222 diverts from the base of transistor 213 such that transistor 213 conducts more heavily which tends to increase the charging current. As a consequence, and in a fashion similar to that described above for the discharge path through transistor 205, a control loop is established which maintains an essentially constant current charging source. The consequence of such constant current charging source is that the charging pulses which correspond to the voltage pulses provided by the bridge rectifier 104 through V+ terminal 106 are essentially constant throughout the regular charging cycle.

If MED pin 115a is grounded by the aforementioned grounding programming plate, transistor 197 is turned on and a current path is completed from its emitter to collector and into the base 223 of transistor 224. As the charging current tends to increase, the voltage drop across the serial combination of resistors 215/216 and 217/218 (i.e., the voltage drop from the emitter of transistor 197 to the anode of diode 219) tends to increase, and transistor 224 tends to conduct more heavily, thus robbing transistor 213 of base current which tends to decrease the charging current. Again, a control loop is established which produces a constant charging current. However, because the controlling voltage drop (across the serial combination of resistors 215/216 and 217/218) is developed across a higher effective series resistance than for the high charging current case described above (with resistors 217/218 only), less charging current will be required to establish a stable condition in the control loop. Accordingly, the charging current will still be controlled at a constant rate but at a lower value than for the case of the high current charging described hereinabove. Similarly, when LO pin 114a is grounded instead of the MED pin 115a, transistor 196 is turned on and resistor 214 is effectively added to the series parallel resistor network described in connection with the foregoing circuits. Accordingly, the current control voltage is developed across an increased level of resistance. Such voltage drop is applied across the base emitter junction of transistor 225 again establishing a constant current control loop which maintains the charging current at a yet lower constant value than that established by grounding the MED pin 115a. Thus, the net result of transistors 213, 197, 196, 222, 224, and 225 operating in conjunction with resistors 211, 192, 193, 214, 215, 216, 217 and 218 is that a constant current charging source is established which operates similarly to the constant current discharge path described previously but which allows differing discrete current levels to be established according to the grounding of the LO and MED pins 114a and 115a, respectively, resulting from the absence or presence of corresponding apertures in the above described programming plates.

As is known to those familiar with the art of battery charging, once the full charge has been stored in the battery, it is desirable (although not necessary) to maintain the battery in a fully charged condition by applying what is known as a trickle charge. This trickle charge, as the name implies, is a continuing supply of very low level additional current to the battery in order to compensate for internal discharge which may occur through unavoidable internal resistances or gradual chemical changes. Accordingly, provisions are made within the Battery Manager for switching from the charging mode to a trickle charge mode when main charging has been completed.

As described below in connection with the timing circuits provided for timing the duration of the main or principal charge, a trickle signal is produced at the trickle terminal 210/210a (FIG. 13). Such trickle signal will be high. Reference to the left hand portion of FIG. 13 will reveal that if either the trickle signal at 210 or the signal on the CH− terminal 155 (which indicates the discharge mode) is high, transistor 157 is turned on and transistor 213 is robbed entirely of base current, the current through resistor 211 passing instead through the collector to emitter path of transistor 157. This causes the regular charging path described above to be broken. However, it should also be observed that when the trickle signal at terminals 210 and 210a is high, such voltage condition is extended through resistor 226 to the base of transistor 227, thus turning transistor 227 on. Accordingly, the voltage on the collector of transistor 227 falls, and such reduced voltage is communicated through resistor 228 to the base of transistor 229, thus turning transistor 229 on and allowing current to flow from V+ terminal 106a through resistor 230, the emitter to collector of transistor 229, diode 231 and conductors 232 and 202 to BAT+ terminal 112a, thus providing a trickle charge to the battery.

The aforementioned trickle current value is established by the value of voltage developed across resistor 230 when conducting current at a value of about 25% of the low regular charging current. Accordingly, the trickle charging current is sufficiently low so that it can be maintained indefinitely without the danger of overcharging the battery. Thus, the battery, after the discharge/regular charge cycle is completed, is maintained in a fully charged state of constant readiness by the trickle charge.

Those who are familiar with the art of battery charging, recognize that batteries such as those of the nickel cadmium variety exhibit a fairly constant terminal voltage over their normal range of charge levels. Accordingly, other than for a low value to signify discharge, it is impracticable to determine the level of battery charge on such a battery by measuring its terminal voltage. For this reason, and in accordance with one of the features of the invention hereof, the duration of the constant current regular charging is controlled by means of a timer 236 (FIG. 12). Timer 236 is additionally identified with the manufacturer's part number 74HC4060 which is a standard catalog product manufactured by the Motorola Corporation. It is a high speed C-MOS integrated circuit. Of course, other similar timer circuits could be used.

Several of the terminals are unused. However, connections are made to terminals 3 and 9-12 which are seen to correspond to terminal designations 014, PO, PO−, PI and RST.

The integrated circuit timer 236 is connected as a 14 bit binary counter with an internal oscillator serving as the time base. The oscillator frequency is determined by the values of capacitor 237 and resistors 238, 239 and 240 according to the data sheet which is provided by the manufacturer and which accompanies the 74HC4060 product.

Reference again to the table of FIG. 9 will reveal that for all but the lowest item on the list, either the LOV− or PIN-C programming pin will be grounded by the programming plate. The last item which is the single exception to this condition, is the highest capacity of the batteries which receives a longer timed charge than the others. Since this battery charge capacity is essentially twice that of the next highest level, it will receive a timed charge of about twice as long. In addition, it will be observed from reference to the lower left hand corner of FIG. 10 that when either the PIN-C terminal 116a or the LOV− terminal 117a is grounded, the electrical signal appearing on FAST− terminal 241 will also be low. Therefore, and referring again to FIG. 12, it will be observed that FAST− terminal 241a will be low and such low potential is conducted through resistor 242 to the base of transistor 243 thereby forward biasing its emitter base junction and turning it on. When transistor 243 is on, the effective resistance paralleling capacitor 237 through conductors 244 and 245 is essentially equal to the combination of resistor 240 and 238, thus establishing the normal (i.e., fast) counter frequency of about 2 kilohertz.

As will be recalled from the foregoing description, and from reference again to FIG. 8, when the 3400 milliampere hour battery is positioned on the Battery Manager for discharge/change, both the LOV− and PIN-C terminals are high in electrical potential, that is, neither pin is grounded. Accordingly, and referring again to the lower left hand corner of FIG. 10, it will be observed that the fast-terminal 241 will also be high in electrical potential. Accordingly, and referring again to FIG. 12, the corresponding fast-terminal 241a will be high and transistor 243 will be turned off, thus effectively isolating resistors 240 and 238 from the timing circuit associated with capacitor 237. Accordingly, the effective resistance paralleling capacitor 237 becomes approximately twice the previous value. This in turn increases the RC time constant for timer 236 so that it becomes essentially twice as high, thus resulting in a change in its oscillator frequency to about one half of its previous value, or about one kilohertz. Since this oscillator frequency rate is approximately one half that of the aforementioned normal frequency of about two kilohertz, it is evident that when operating in the one kilohertz mode, the timer 236 will take approximately twice as long to time out, thus providing an essentially twice as long period during which charging will be conducted for the 3400 milliampere hour battery.

Referring again to FIG. 12, the connections of capacitor 237, resistor 238, resistor 239 and resistor 240 to the PO, PO− and the PI terminals of timer 236 cause the oscillator frequency to be counted by the 14 bit binary counter which is integral to timer 236. However, such counting proceeds only when the CH− terminal 155a is at a low potential (i.e., when in the charge mode) and when trickle terminal 210a is low (i.e., when regular charging is proceeding in contrast with trickle charging). This is accomplished through the connection of the CH− terminal 155a through conductor 247 to the RST pin of timer 236, such connection causing timer 236 to reset and not to count during the discharge mode, and by connecting trickle terminal 210a to the input 13 of NAND gate 249. NAND gate 249 is connected as an inverter such that when the voltage on trickle terminal 210a is high, the output of NAND gate 249 is low, thus causing diode 250 to conduct, disabling the oscillator of timer 236 by correspondingly lowering the voltage at the junction of capacitor 237, resistor 238, resistor 239 and resistor 240.

Timer 251 is a well known commercially available integrated circuit sold under the designation of 74HC4040 and is similar to timer 236 except that timer 251 does not include an internal oscillator and it includes a 12 bit binary counter instead of a 14 bit counter as is the case with timer 236. As would be expected from reference to the terminal connections for timer 236, the highest order bit output occurs at terminal 014. Such bit will make its high-to-low transition when exactly $2^{14}$ cycles of the internal oscillator have been counted. Such transition constitutes an overflow or complete cycling of the 14 bit counter. Such counter overflow signal from the 014 output is connected via conductor 252 to the CLK input terminal of timer 251, the CLK terminal being the input to the 12 bit binary counter integral to timer 251.

Timer 251 is enabled to count only when in the charging mode as a consequence of the connection of its RST terminal through conductor 253 and 247 to the RST terminal of timer 236 and to the CH− terminal 155a.

As a consequence of the foregoing interconnections between timers 236 and 251, when the 14 bit counter of timer 236 has overflowed $2^{11}$ times (thus stepping the counter of timer 251 through its range), the condition of terminal 012 will change to high. Accordingly, the high electrical potential will be communicated via conductor 254 to trickle terminal 210a where such signal, as hereinabove described, is employed to disable the timer 236 time base oscillator, terminate the regular charging current path and connect the trickle charging current path.

It will now be evident to those skilled in the art that for the hereinabove described preferred embodiment, the normal charge time is approximately 4.6 hours and the charging time for the highest capacity battery is approximately twice that or 9.2 hours. These times are calculated by recognizing that the counting time for timer 236 is $2^{14}$ cycles and that of the auxiliary timer 251 is $2^{11}$ cycles, thus yielding a total cyclical counting of $2^{25}$ counts. For the normal time base frequency of two kilohertz, this yields a measured elapsed time of $2^{25}$ times 1 divided by 2000 which equals approximately 16,777 seconds which equals approximately 4.6 hours. The time for the higher capacity battery will be calculated in a similar fashion except that the time there will be calculated as $2^{25}$ times 1 divided by 1/1000 which equals approximately 33,554 seconds which equates to approximately 9.3 hours. Thus, in summary, for the single case of the highest capacity battery, the time base frequency is halved from 2 kilohertz to 1 kilohertz with the result that the time required to accumulate the same number of counts is doubled.

As heretofore mentioned, the preferred embodiment includes a simple and effective visual indication of recharge level condition. This is accomplished by extending connections from terminals 08 through 012 individually through isolation diodes 255-259 and through a weighted-resistor digital-to-analog conversion circuit which includes resistors 260-264. Values of these resistors are selected such that the higher order counter bits (e.g., bits appearing at terminals 011 and 012 are connected through progressively lower resistor values to the summing node which is the common junction of resistors 261 and 262 with resistors 260-264. The net effect of this weighted resistor type of digital to analog conversion is that as higher order bits of the counter circuits within timer 251 switch from low to high (i.e., as the count progresses) more and more current is delivered through the diode and resistor pairs to the summing node 263. Thus, the higher the order of the bit, the smaller the resistor and the more current that is delivered to the summing node 263 as a result of that particular bit achieving its high condition.

As a consequence of the current summing action at node 263, a voltage is developed across resistor 261 that is proportional to the digital binary count value represented by the five highest order output digits represented by terminals 08-012 of timer 251. When the battery manager is in the charge mode, transistor 265 is on and transistor 266 is off thus causing the output signal at SIG terminal 267 to be effectively connected through transistor 265 to summing node 263 and consequently to have its approximate voltage value. This analog voltage value, of course, represents the elapsed time during a regular charge and is used to drive an analog display (described hereinafter in connection with FIG. 11) to indicate the charge level that should be present in the battery being charged at any particular time during the charging portion of the conditioning cycle.

If instead of being in the charge mode, the circuits are in the discharge mode, transistor 265 is off (because the potential on CH− terminal 155b is high) and transistor 266 is on because the voltage on CH terminal 200a is low thus forward biasing the emitter base junction of transistor 266. This in turn permits the voltage on SIG terminal 267 to approach that residing at junction 268 between resistors 269 and 270, the latter being further connected through resistor 271 to ground and through diode 272 to HIV− terminal 164a. Resistor 269 is of course connected to BAT+ terminal 173a and consequently is connected to receive voltage at the level then appearing on the battery under discharge.

It will be recalled from the description above that the signal from the LOV− terminal 117 is inverted through transistor 162 (lower right hand section of FIG. 10) thereby to produce the potential appearing on HIV− terminal 164. Thus, when the LOV− pin 117 is grounded which occurs only when a 6 volt battery is being conditioned, the signal appearing on HIV− terminal 164a is high and consequently diode 272 (FIG. 12) does not conduct. In this situation, the effective lower branch of the aforementioned voltage divider is the sum of resistors 270 and 271. However, when a 7.2-7.5 volt battery is being conditioned, the signal appearing on the HIV− terminal 164a is low (ground) and consequently diode 272 conducts to ground, effectively removing resistor R271 from the lower branch of the voltage divider which then consists essentially only of resistor 270. The net effect of this voltage divider change is that when the conditioner is in the discharge mode, the potential appearing on SIG terminal 267 includes a substantially higher percentage of the voltage appearing at the BAT+ terminal when the HIV− signal is high (i.e., when a 6 volt battery is being conditioned) than when a 7.2-7.5 battery is being conditioned. Accordingly, the scale factor for indicating the battery discharge voltage is adjusted such that consistent analog display readings will occur for similar voltage degradation percentages irrespective of whether the battery is of the 6 volt or the 7.2-7.5 voltage type.

Now turning to FIG. 11, it will be observed that it includes a standard integrated circuit of the type generally available from a variety of electronic component supply houses. For the preferred embodiment hereof, an integrated circuit identified with catalog number LM3914/NTEL508 manufactured by the National Semiconductor Corporation was selected. Such integrated circuit is identified with the symbol 273 and will be observed to be connected in accordance with the manufacturer's data sheet for selecting the values of resistors 274-277 and for making connections to the mode, RLO, RHI, REF ADJ and REF OUT terminals such that the resulting bar graph display comprising light emitting diodes 278-287 represents the range of voltage swing of the voltage appearing on SIG terminal 267a. As will be observed, resistors 274 and 277 are in the nature of potentiometers so as to provide for calibration of the display for the specific range of the SIG signal voltage such that none of the light emitting diodes are illuminated when the SIG voltage is at or below the desired minimum value and that all are active when the SIG voltage is at its maximum value. Outputs for the light emitting diodes 278-287 are connected in common (as shown) and then via conductor 288 to a 5 volt supply terminal 111g. These light emitting diodes 278-287 correspond to light emitting diode 17a-17j shown in FIG. 1.

It should now be evident that there has been described herein a preferred embodiment of an improved Battery Manager specially adapted for optimally managing a representative group of nickel cadmium batteries through automatically programmed discharge and individually tailored recharging, thus eliminating the necessity for operator control by selective settings of circuit parameters as by the selective setting of dip switches.

Although the invention hereof has been described by way of example of a preferred embodiment, it will be evident that other adaptations and modifications may be employed without departing from the spirit and scope thereof. For example, programming plates could readily be provided for batteries of different ampere hour charging requirements; and through the change in values of resistors across which charging currents develop key voltages, provision could be made for employing the principles hereof in the discharge and recharge of batteries having yet other voltage and or charge ratings. Moreover, other types of programming could be provided by the programming plates. Such could include bar coding, the use of Hall effect devices and other types of encoding for the plates.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A battery conditioner comprising:
   a. a plurality of differing mechanical devices representing a plurality of batteries of differing characteristics, said mechanical devices including programming means tailored to the characteristics of each of said batteries for automatically programming said battery conditioner to supply to said batteries individually programmed levels of charge representing for said batteries essentially optimum levels of such charge;
   b. attaching means for attaching said mechanical devices to said batteries thereby to match each one of said batteries with the one of said mechanical devices which includes programming means tailored to the characteristics of said each one of said batteries;
   c. a housing for individually receiving said mechanical devices, said housing including electrical circuits for discharging and recharging said batteries;
   d. sensing means associated with said housing for sensing the presence of one of said mechanical devices and for making electrical connection to terminals of one of said batteries attached to said one of said mechanical devices; and
   e. control means including said sensing means for discharging the connected one of said batteries for which said electrical connection is made to a voltage level tailored to voltage characteristics of said connected one of said batteries and then automatically recharging said connected one of said batteries to a predetermined programmed level according to said programming means.

2. A battery conditioner according to claim 1 in which said electrical circuits for discharging and recharging said batteries establish any selected one of a predetermined group of different discrete charging levels.

3. A battery conditioner according to claim 2 in which said discrete charging levels are each constant current.

4. A battery conditioner according to claim 2 in which said programming means automatically selects a predetermined one of said discrete charging levels.

5. A battery conditioner according to claim 3 in which said programming means automatically selects a predetermined one of said constant current charging levels.

6. A battery conditioner according to claim 1 in which said attaching means comprises an adhesive.

7. A battery conditioner according to claim 1 in which said sensing means senses said presence of said one of said mechanical devices by making electrical contact with said one of said mechanical devices.

8. A battery conditioner according to claim 1 in which said housing includes on the exterior thereof a pair of rails for receiving selected ones of said mechanical devices.

9. A battery conditioner according to claim 1 in which said housing includes on the exterior thereof three rails for selectively receiving said batteries.

10. A battery conditioner according to claim 1 in which said mechanical devices include electrically conductive regions.

11. A battery conditioner according to claim 1 in which said control means is activated to initiate said discharging and recharging only after a predetermined delay following said sensing of the presence of one of said mechanical devices.

12. A battery conditioner comprising:
   a. a plurality of differing mechanical devices representing a plurality of batteries of differing characteristics, said mechanical devices including programming plates tailored to the characteristics of said batteries for automatically programming said battery conditioner to supply to each of said batteries a programmed level of charge individually representing for each of said batteries an essentially optimum level of such charge;
   b. means for attaching said programming plates to said batteries thereby to match each of said batteries with the one of said programming plates which is tailored to the characteristics of said each of said batteries;
   c. a housing for individually receiving said mechanical devices, said housing including electrical circuits for discharging and recharging said batteries at different recharging rates;
   d. a sensor associated with said housing for sensing the presence of one of said mechanical devices and for making electrical connection to terminals of one of said batteries attached to said one of said mechanical devices; and
   e. means including said sensor for discharging the one of said batteries for which said electrical connection is made to a voltage level tailored to voltage characteristics of said one of said batteries and then automatically recharging said one of said batteries to a predetermined programmed level according to said programming plates.

13. A method of conditioning a battery comprising:
   a. providing a programming plate having a plurality of apertures therethrough representing electrical characteristics of a predetermined type of battery;
   b. obtaining a battery of said predetermined type;
   c. attaching said programming plate to said battery;
   d. providing a battery conditioner having a surface region for mating engagement with said programming plate;
   e. providing in said surface a plurality of programming pins for registration with at least some of said apertures thereby to identify said electrical characteristics of said predetermined type of battery and for automatically programming said battery conditioner to condition said battery according to said electrical characteristics of said predetermined type of battery; and
   f. activating said battery conditioner when said electrical characteristics of said predetermined type of battery are identified thereby to condition said battery according to its electrical characteristics.

14. A method according to claim 13 in which the step of conditioning said battery according to said electrical characteristics further includes discharging said battery until the electrical potential at the terminals of said battery is equal to or less than a predetermined level.

15. A method according to claim 13 in which the step of conditioning said battery according to said electrical characteristics further includes charging said battery at a predetermined constant current level during a predetermined period of time.

16. A method according to claim 13 in which the step of conditioning said battery according to said electrical characteristics further includes:
   a. discharging said battery until the electrical potential at the terminals of said battery is equal to or less than a predetermined level, and
   b. charging said battery at a predetermined constant current level during a predetermined period of time.

* * * * *